(12) United States Patent
Zhao (10) Patent No.: US 8,792,894 B2
(45) Date of Patent: Jul. 29, 2014

(54) METHOD AND SYSTEM FOR REALIZING ENERGY SAVING CONTROL OF BS

(75) Inventor: Jie Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 468 days.

(21) Appl. No.: 13/132,800

(22) PCT Filed: Dec. 29, 2008

(86) PCT No.: PCT/CN2008/002118
§ 371 (c)(1),
(2), (4) Date: Jun. 3, 2011

(87) PCT Pub. No.: WO2010/078674
PCT Pub. Date: Jul. 15, 2010

(65) Prior Publication Data
US 2011/0244867 A1    Oct. 6, 2011

(51) Int. Cl.
*H04W 36/00* (2009.01)
*H04W 52/02* (2009.01)
*H04W 88/08* (2009.01)
*H04W 88/12* (2009.01)

(52) U.S. Cl.
CPC .......... *H04W 52/0235* (2013.01); *H04W 88/08* (2013.01); *Y02B 60/50* (2013.01); *H04W 88/12* (2013.01)
USPC ....................................... 455/438

(58) Field of Classification Search
CPC ............ H04W 52/00; H04W 52/0203; H04W 52/0206
USPC .......... 455/13.4, 522, 572–574, 127.1, 127.5, 455/343.2; 370/311, 318
See application file for complete search history.

(56) References Cited

U.S. PATENT DOCUMENTS

2007/0066273 A1* 3/2007 Laroia et al. ................ 455/343.2
2008/0075119 A1* 3/2008 Zhang et al. .................. 370/503

FOREIGN PATENT DOCUMENTS

| CN | 1788434 A | 6/2006 |
|---|---|---|
| EP | 2002673 A2 | 12/2008 |
| JP | 6269039 A | 9/1994 |
| JP | 7170566 A | 7/1995 |
| JP | 2008109423 A | 5/2008 |
| WO | 02/07464 | 1/2002 |
| WO | 2008002699 A2 | 3/2008 |
| WO | 2008136416 A1 | 11/2008 |

OTHER PUBLICATIONS

Article TSG-RAN Working Group 3 (Meeting #6), TSGR3#6(99) 861, Sophia Antipolis, France Aug. 23-27, 1999, Source: Motorola, Title Cell Reconfiguration, pp. 1-6.

(Continued)

*Primary Examiner* — San Htun
(74) *Attorney, Agent, or Firm* — Banner & Witcoff, Ltd.

(57) ABSTRACT

The present invention discloses a method for implementing energy saving control at a NodeB, comprising: when a cell of a NodeB is required to sleep, a Radio Network Controller (RNC) sending an indication of sleeping a cell to the NodeB, and the NodeB sleeping the cell to enter into an energy saving state; and when the cell of the NodeB is required to wake up, the RNC sending an indication of waking up a cell to the NodeB, and the NodeB waking up the cell to exit the energy saving state. The present invention also discloses a system for implementing energy saving control at a NodeB.

6 Claims, 4 Drawing Sheets

(56) References Cited

OTHER PUBLICATIONS

International Search Report for PCT/CN2008/002118 dated Sep. 22, 2009.

3rd Generation Partnership Project; Technical Specification Group Radio Access Network; UTRAN Iub interface Node B Application Part (NBAP) signalling (release 7) 3GPP TS 25.433 V7.10.0 (Sep. 2008).

* cited by examiner

METHOD AND SYSTEM FOR REALIZING ENERGY SAVING CONTROL OF BS

TECHNICAL FIELD

The present invention relates to the communication field, and particularly, to a method and a system for implementing control of the base station energy savings.

BACKGROUND OF THE RELATED ART

At present, the telecommunication industry gradually enters into a slender profit stage. At the same time when the telecommunication operators seek to enlarge market share and increase income by developing service types, they pay more and more attention to expenditure reducing such as energy savings and so on. The base station is a large resource consumer of operators, so it is of importance in energy savings. Simultaneously, common civilians pay more and more attention to the issue that the base station brings electromagnetic radiation pollution in working state.

At present, the base station mainly uses new types of energy saving and environmental protection devices and improves heat dissipating materials to decreases the power consumption of the base station, and reduces power consumption from heat dissipation as well to implement energy saving. However, the following problems exist in this technique: application of these types of devices increases the manufacturing cost of the base station, and, on the other side, a mass of base stations which do not use these types of devices can not achieve the aim of energy savings.

Content of the Invention

The technical problem to be solved in the present invention is to provide a method and a system for implementing energy saving control at a NodeB, which does not need to change hardware to achieve the effect of energy saving and environmental protection of the base station.

To solve the above problem, a method for implementing energy saving control at a NodeB, is provided by the present invention, comprising:

when a cell of a NodeB is required to sleep, a Radio Network Controller (RNC) sending an indication of sleeping the cell to the NodeB, and the NodeB sleeping the cell to enter into an energy saving state; and when the cell of the NodeB is required to wake up, the RNC sending an indication of waking up the cell to the NodeB, and the NodeB waking up the cell to exit the energy saving state.

Furthermore, the method may have the following features:
the step of the RNC sending an indication of sleeping the cell to the NodeB, and the NodeB sleeping the cell comprises:
the RNC making users in the cell of the NodeB required to sleep be switched into other cells;
the RNC sending an energy saving control indication to the NodeB to instruct the NodeB to sleep the cell immediately; and
the NodeB sleeping the cell.

Furthermore, the method may have the following features:
the step of the RNC sending an indication of sleeping the cell to the NodeB, and the NodeB sleeping the cell comprises:
the RNC sending an energy saving control indication to the NodeB to instruct the NodeB to sleep the cell friendly;
the NodeB switching users in the cell required to sleep into other cells; and
the NodeB sleeping the cell.

Furthermore, the method may have the following features:
the step of the RNC sending an indication of waking up the cell to the NodeB, and the NodeB waking up the cell comprises:

the RNC sending an energy saving control indication to the NodeB to instruct the NodeB to wake up the cell immediately; and
the NodeB recovering a working state value of pilot channel power of a carrier of the cell.

Furthermore, the method may have the following features:
the RNC makes the users in the cell of the NodeB required to sleep into other cells by controlling the NodeB to gradually reduce pilot channel power of the carrier of the cell required to sleep.

Furthermore, the method may have the following features:
the NodeB switches users in the cell required to sleep into other cells by gradually reducing pilot channel power of the carrier of the cell required to sleep.

Furthermore, the method may have the following features:
a cell reconfiguration request message is used to carry the energy saving control indication;
a cell reconfiguration response message is used to indicate that energy saving control process is successful; and
a cell reconfiguration failure message is used to indicate that energy saving control process is failed, wherein the cell reconfiguration failure message carries a failure cause indicating that energy saving control fails;
or,
an energy saving control indication message is used to carry the energy saving control indication;
an energy saving control response message is used to indicate that energy saving control process is successful; and
an energy saving control failure message is used to indicate that energy saving control process is failed.

To solve the above problem, the present invention also provide a system for implementing energy saving control at a NodeB, including a Radio Network Controller (RNC) and a NodeB; wherein when a cell of the NodeB is required to sleep, the RNC is used for sending an indication of sleeping a cell to the NodeB, and when the cell of the NodeB is required to wake up, the RNC is used for sending an indication of waking up the cell to the NodeB; and the NodeB is used for sleeping or waking up the cell according to the indication of the RNC.

Furthermore, the system may have the following features:
the RNC is also used for making users in the cell of the NodeB required to sleep be switched into other cells, and then sending an energy saving control indication to the NodeB to instruct the NodeB to sleep the cell immediately.

Furthermore, the system may have the following features:
the RNC is also used for sending an energy saving control indication to the NodeB to instruct the NodeB to sleep the cell friendly, and the NodeB is also used for switching users in the cell required to sleep into other cells.

The present invention adds the support for the requirement of energy saving and environmental protection of the NodeB to the 3GPP protocol, which enables the NodeB to implement energy saving control, and has the following beneficial effects:

1. the RNC instructs the NodeB to operate energy saving control, which does not need to change hardware to achieve the effect of energy saving and environmental protection at the base station;

2. the RNC makes the users in the cell of the NodeB required to sleep into other cells, or the NodeB switches users in the cell required to sleep into other cells, which ensures that calls of the users will not be dropped during the process of entering into the energy saving state;

3. after the users in the cell required to sleep are switched into other cells, the cell sleeps immediately, which ensures the process of entering into the energy saving state is rapid;

4. the energy saving control process of the base stion will not result in deleting and rebuilding of the cell, which indicates that the cell of the NodeB has 3 types of states: a normal state (unblocked state), a blocked state, and an energy saving sleeping state.

PREFERRED EMBODIMENTS OF THE PRESENT INVENTION

The present invention achieves the aim of energy saving and environmental protection at a NodeB (base station) by instructing by a Radio Network Controller (RNC) the NodeB to control energy saving (by means of sleeping and waking up some carriers, and so on).

That is:

when a cell of a NodeB is required to sleep, a RNC sends an indication of sleeping a cell to the NodeB; the NodeB sleeps the cell to enter into an energy saving state;

when a cell of a NodeB is required to wake up, the RNC sends an indication of waking up the cell to the NodeB; the NodeB wakes up the cell to exit the energy saving state.

The RNC sends an energy saving control indication to the NodeB to instruct the NodeB to sleep or wake up a cell, where energy saving control indications include indications of sleeping a cell and indications of waking up a cell.

The indications of sleeping a cell include indications of sleeping a cell immediately and indications of sleeping a cell friendly; and The indications of waking up a cell include indications of waking up a cell immediately.

Wherein there are two modes of sleeping a cell.

Mode 1, sleeping a cell is controlled by the RNC, which includes the following steps specifically:

(1) the RNC switches users in the cell required to sleep into other cells to prevent the users from dropping calls, and controls users just accessing this cell;

For instance, the RNC controls the NodeB to gradually reduce the pilot channel power of a carrier of the cell required to sleep, and users under this cell will be switched into other cells according to the existing switching policy due to gradually weakening of the pilot signal, and users just accessing this cell will also be rejected; when the pilot power is weaken to a smaller value, the pilot channel (transmitting) power of the carrier of the cell is further reduced to 0 or the carrier is turned off in the subsequent steps, so as to ensure that calls of the users are not dropped.

(2) after the RNC insures that all of the users in the cell are switched into other cells, the RNC sends an energy saving control indication (immediately sleeping the cell) to the NodeB to instruct the NodeB to sleep the cell immediately;

(3) after the NodeB receives the energy saving control indication (sleeping the cell immediately) of the RNC, the NodeB sleeps the cell immediately (reduces the pilot channel power of the carrier of the cell to 0 or turns off the carrier); and if the operation is successful, the NodeB returns an energy saving control success response to the RNC;

if the operation is failed, the NodeB returns an energy saving control failure response to the RNC, where the energy saving control failure response carries the failure cause (the energy saving control fails);

the block behavior of the NodeB (namely sleeping a cell) will not send a block message (BLOCK RESOURCE REQUEST) to inform the RNC.

Mode 2, sleeping a cell is controlled by the NodeB, which includes the following steps specifically:

(1) the RNC sends an energy saving control indication (sleeping a cell friendly) to the NodeB to instruct the NodeB to sleep a cell friendly;

(2) after the NodeB receives the energy saving control indication (sleeping a cell friendly) of the RNC, the NodeB switches users in the cell required to sleep into other cells to prevent calls of the users from dropping, and controls users just accessing this cell;

For instance, the NodeB gradually reduces the pilot channel power of a carrier of the cell which is required to sleep, and the users under the carrier will be switched to other cells according to the existing switching policy due to gradually weakening of the pilot signal, and users just accessing this cell will be rejected.

(3) after the NodeB insures that all of the users in the cell are switched into other cells, the NodeB sleeps this cell (reduces the pilot channel power of the carrier of the cell to 0 or turns off the carrier), so as to make sure that calls of users are not dropped;

if the operation succeeds, the NodeB returns an energy saving control success response to the RNC;

if the operation fails, the NodeB returns an energy saving control failure response to the RNC, where the energy saving control failure response carries the failure cause (the energy saving control fails);

The block behavior of the NodeB (namely sleeping a cell) will not send a block message (BLOCK RESOURCE REQUEST) to inform the RNC.

Wherein waking up a cell includes the following steps:

(1) the RNC sends an energy saving control indication (waking up a cell immediately) to the NodeB to instruct the NodeB to wake up the cell immediately and recover the previous value of the pilot signals of the cell;

(2) after the NodeB receives the energy saving control indication (waking up the cell immediately) of the RNC, the NodeB reopens carriers, and recovers working state value of the pilot channel power of the carriers of the cell, namely, the carriers resume working;

if the operation is successful, the NodeB returns an energy saving control success response to the RNC; and if the operation is failed, the NodeB returns an energy saving control failure response to the RNC, where the energy saving control failure response carries the failure cause (the energy saving control fails);

When the pilot configuration of the NodeB is recovered, the NodeB will not send a unblock message (UNBLOCK RESOURCE INDICATION) to inform the RNC.

In this way, it is equivalent that the cell of the NodeB has 3 states: a normal state (unblocked state), a blocked state, and an energy saving sleeping state. (The NBAP protocol defines the NodeB can originate the resource block operation and unblock operation. The common way is the network management operation of the NodeB can be manually configuring blocking and unblocking of the cell. Herein a block state refers to a cell state induced by blocking a cell originated by the NodeB).

In a Wideband Code Division Multiple Access system, if the RNC needs to change the resource configuration of a cell of a NodeB (such as the pilot channel power (CPICH Power) of a carrier of a Cell), the RNC sends a CELL RECONFIGURATION REQUEST to the NodeB, and after the NodeB performs a process, and the NodeB returns a CELL RECONFIGURATION RESPONSE if the process succeeds; and returns a CELL RECONFIGURATION FAILURE if the process fails.

In the present invention, the cell reconfiguration request message of the Iub interface can be extended to be used to carry the energy saving control indication: adding the energy saving control indication Information Element (IE), writing the energy saving control indications including 3 types: sleeping a cell immediately, sleeping a cell friendly, and waking up a cell immediately into this Information Element; the cell reconfiguration failure message of the Iub interface can be extended to be used to carry the failure cause indicating the energy saving control failure: add "energy saving control fails" into the failure cause IE.

The modification related to the 25.433 protocol is as followings (the parts with the bold italic and underline are new added parts):

9.1.27 Cell Reconfiguration Request (Cell Reconfiguration Request Message)

9.1.27.1 FDD Message (Frequency Division Duplex Message)

| IE/Group Name | Presence | IE Type and Reference |
|---|---|---|
| *Energy Saving Control Indication* | O (Optional) | *ENUMERATED (Sleep a cell friendly, Sleep a cell immediately, Wake Up a cell immediately)* |

9.1.27.2 TDD Message (Time Division Duplex Message)

| IE/Group Name | Presence | IE Type and Reference |
|---|---|---|
| *Energy Saving Control Indication* | O (Optional) | *ENUMERATED (Sleep a cell friendly, Sleep a cell immediately, Wake Up a cell immediately)* |

9.2.1.6 Cause

| IE/Group Name | Presence | IE Type and Reference |
|---|---|---|
| CHOICE Cause Groups | M (Mandatory) | |
| >Radio Network Layer | | |
| >>Radio Network Layer Cause | M (Mandatory) | ENUMERATED ( ... MIMO not available, *Energy Saving Control failure*) |

A new energy saving control indication (ENERGY SAVING INDICATION) message of the Iub interface could also be added, using this message to carry the energy saving control indication, wherein indicating IE includes 3 types of indications: sleeping a cell immediately, sleeping a cell friendly, and waking up a cell immediately.

And a new energy saving control response message (ENERGY SAVING RESPONSE) is added to indicate that the energy saving control process is successful; and a new energy saving control failure message (ENERGY SAVING FAILURE) is added to indicate that the energy saving control process is failed.

The system for implementing the NodeB energy saving control includes: a RNC and a NodeB, wherein the RNC is used for sending an indication of sleeping the cell to the NodeB when a cell of the NodeB is required to sleep; and is used for sending an indication of waking up the cell to the NodeB when a cell of a NodeB is required to wake up;

the NodeB is used for sleeping or waking up the cell according to the indication of the RNC.

When sleeping a cell is controlled by the RNC, the RNC is used for switching users in the cell required to sleep into other cells, and then sending an energy saving control indication (sleeping a cell immediately) to the NodeB to instruct the NodeB to sleep a cell immediately. The RNC may switch users in the cell required to sleep into other cells by controlling the NodeB to gradually reduce the pilot channel power of carriers of the cell required to sleep.

When sleeping a cell is controlled by the NodeB, the RNC is used for sending an energy saving control indication (sleeping a cell friendly) to the NodeB to instruct the NodeB to sleep a cell friendly. The NodeB is used for switching users in the cell required to sleep into other cells. The NodeB may switch users in the cell required to sleep into other cells by gradually reducing the pilot channel power of carriers of the cell required to sleep.

When a cell of the NodeB is required to wake up, the RNC is used for sending an energy saving control indication to the NodeB to instruct the NodeB to wake up a cell immediately; the NodeB is used for recovering the working state value of the pilot channel power of carriers of the cell.

The technical scheme of the present invention will be described in details in conjunction with accompanying figures and examples in the following.

EXAMPLE 1

Figure 1:
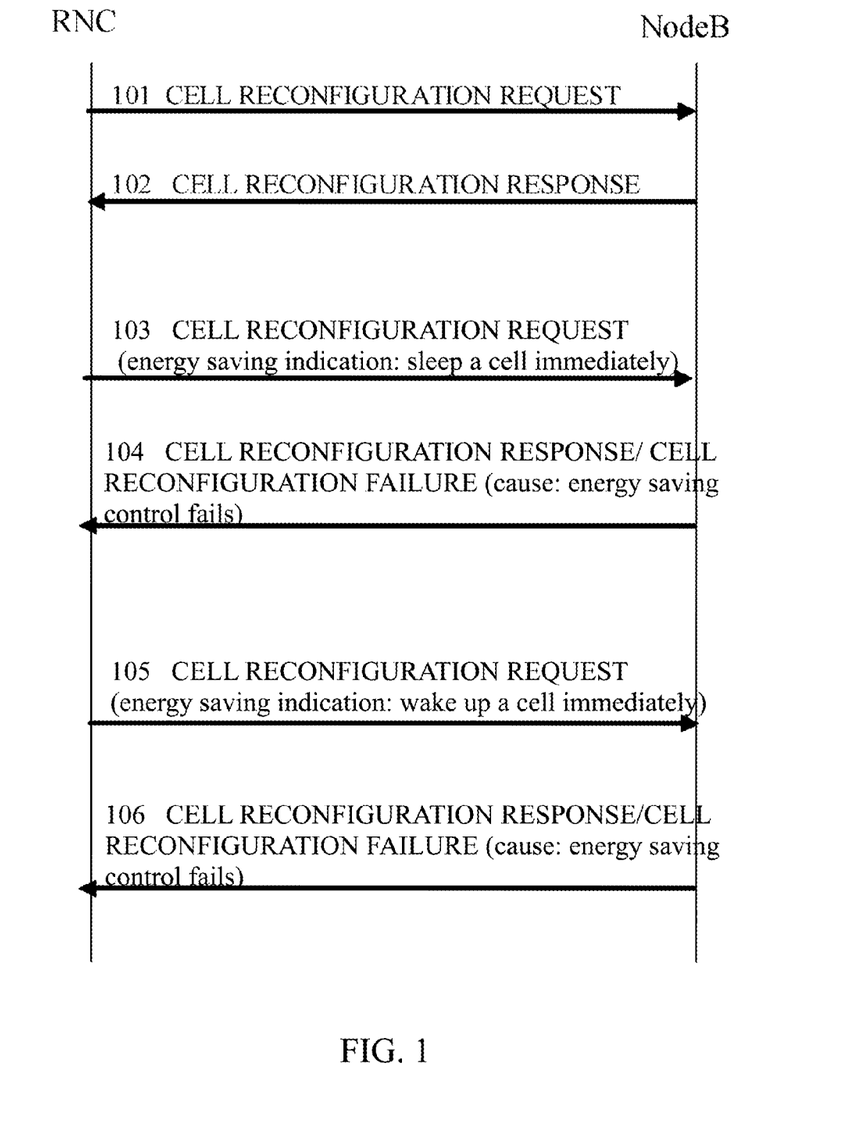
FIG. 1 is a flow chart of example 1 of the present invention.

In this example, sleeping a cell friendly is controlled by the RNC, using a cell reconfiguration request message (CELL RECONFIGURATION REQUEST) to carry the energy saving control indication, and returning a CELL RECONFIGURATION RESPONSE to indicate that the process is successful; returning the CELL RECONFIGURATION FAILURE to indicate that the process is failed. As shown in FIG. 1, the following steps are comprised, wherein steps 101~104 are the process of sleeping a cell, and steps 105~106 are the process of waking up a cell.

Step 101, the RNC determines whether it is required to initiate a cell energy saving control indication, and whether a cell is required to sleep or wake up may be determined by a determination method based on time periods etc. (for instance, it may be configured to sleep parts of cells during 10:00 pm to 7:00 am on non holidays, and wake up cells during other durations); when the RNC determines that the condition of sleeping the cell is meet, the RNC instructs the NodeB to gradually reduce the pilot channel power of carriers by the CELL RECONFIGURATION REQUEST;

Step 102, after receiving the CELL RECONFIGURATION REQUEST, the NodeB reduces the pilot channel power of carriers of this cell, and if the process is successful, the NodeB returns a CELL RECONFIGURATION RESPONSE; if the process is failure, the NodeB returns a CELL RECONFIGURATION FAILURE;

Users under this cell will be switched into other cells according to the existing switching policy due to gradually weakening of the pilot signal, and users just accessing this cell will be rejected.

In steps 101~102, reducing pilot channel power by cell reconfiguration may be accomplished by a plurality of cell reconfiguration processes to gradually reduce pilot channel power, thereby insuring that calls of users are not dropped;

Step 103, when the pilot channel power of carries is reduced to a certain value, after the RNC makes sure that all the users of the cell are switched into other cells, the RNC sends an indication of sleeping a cell immediately by an extended CELL RECONFIGURATION REQUEST message to instruct the NodeB to sleep the cell immediately;

Step 104, after receiving extended CELL RECONFIGURATION REQUEST message, the NodeB sleeps the cell immediately, and if the process is successful, the NodeB returns a CELL RECONFIGURATION RESPONSE; if the process is failed, the NodeB returns a CELL RECONFIGURATION FAILURE, and the failure cause is "energy saving control fails";

Step 105, the RNC determines whether it is required to initiate a cell energy saving control indication (a determination method based on time periods etc. may be used to determine whether a cell is required to sleep or wake up), and when the RNC determines that the condition of waking up the cell is meet, the RNC sends an energy saving control indication (waking up a cell immediately) by an extended CELL RECONFIGURATION REQUEST message to instruct the NodeB to wake up the cell immediately;

Step 106, after receiving the extended CELL RECONFIGURATION REQUEST message, the NodeB wakes up the cell immediately, and if the process succeeds, the NodeB returns a CELL RECONFIGURATION RESPONSE; if the process failed, the NodeB returns a CELL RECONFIGURATION FAILURE, and the failure cause is "energy saving control fails".

EXAMPLE 2

Figure 2:
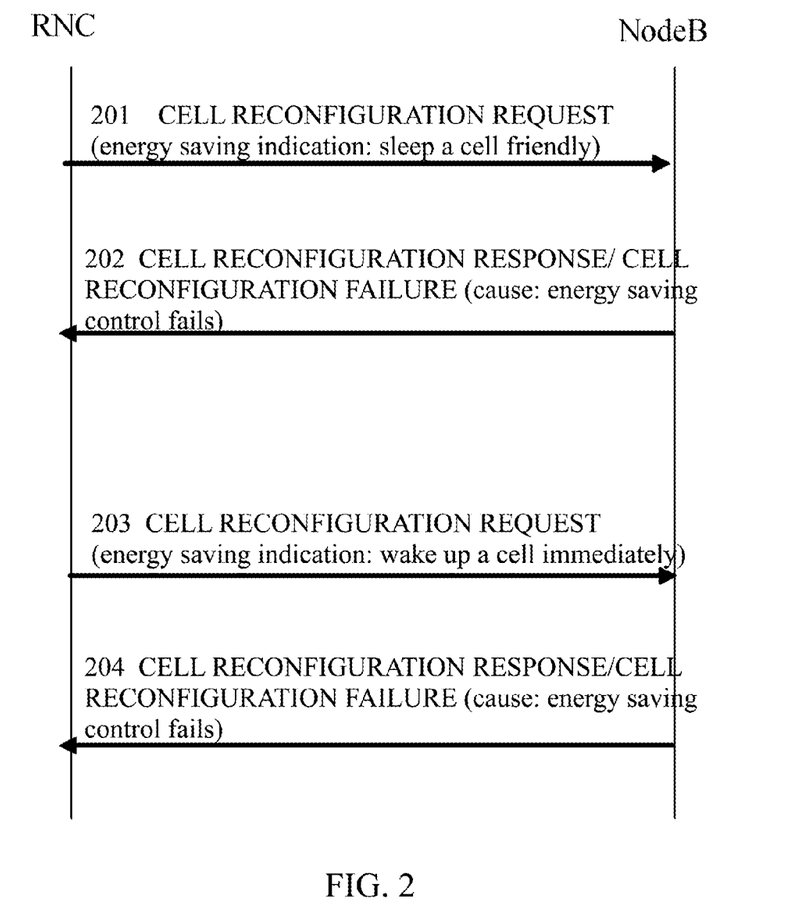
FIG. 2 is a flow chart of example 2 of the present invention.

In this example, the NodeB controls cell sleeping friendly, uses a cell reconfiguration request message (CELL RECONFIGURATION REQUEST) to carry the energy saving control indication, and returns a CELL RECONFIGURATION RESPONSE to indicate that the process succeeds; returns the CELL RECONFIGURATION FAILURE to indicate that the process fails. As shown in FIG. 2, the following steps are comprised, wherein steps 201~202 are the process of sleeping a cell, and steps 203~204 are the process of waking up a cell.

Step 201, the RNC determines whether it is required to initiate an energy saving control indication, whether a cell is required to sleep or wake up may be determined by a determination method based on time periods etc. (for instance, it may be configured that parts of cells are slept during 10:00 pm to 7:00 am on non holidays, and wake up during other durations); after the RNC determines that the condition of sleeping the cell is meet, the RNC sends an indication of sleeping a cell friendly by an extended CELL RECONFIGURATION REQUEST message to instruct the NodeB to sleep a cell friendly;

Step 202, after receiving the extended CELL RECONFIGURATION REQUEST message, the NodeB gradually reduces the pilot channel power of carriers automatically. When the pilot channel power of carries is reduced to a certain value, the NodeB turns off carriers; and if the process succeeds, the NodeB returns a CELL RECONFIGURATION RESPONSE; and if the process fails, the NodeB returns a CELL RECONFIGURATION FAILURE, and failure cause is "energy saving control fails";

Step 203, the RNC determines whether it is required to initiate an energy saving control indication (a determination method based on time periods etc. may be used to determine whether a cell is required to sleep or wake up); and when the RNC determines that the condition of waking up the cell is meet, the RNC sends an indication of waking up a cell immediately by an extended CELL RECONFIGURATION REQUEST message to instruct the NodeB to wake up the cell immediately;

Step 204, after receiving the extended CELL RECONFIGURATION REQUEST message, the NodeB wakes up the cell immediately, if the process succeeds, the NodeB returns a CELL RECONFIGURATION RESPONSE; if the process fails, the NodeB returns a CELL RECONFIGURATION FAILURE, and the failure cause is "energy saving control fails".

EXAMPLE 3

Figure 3:
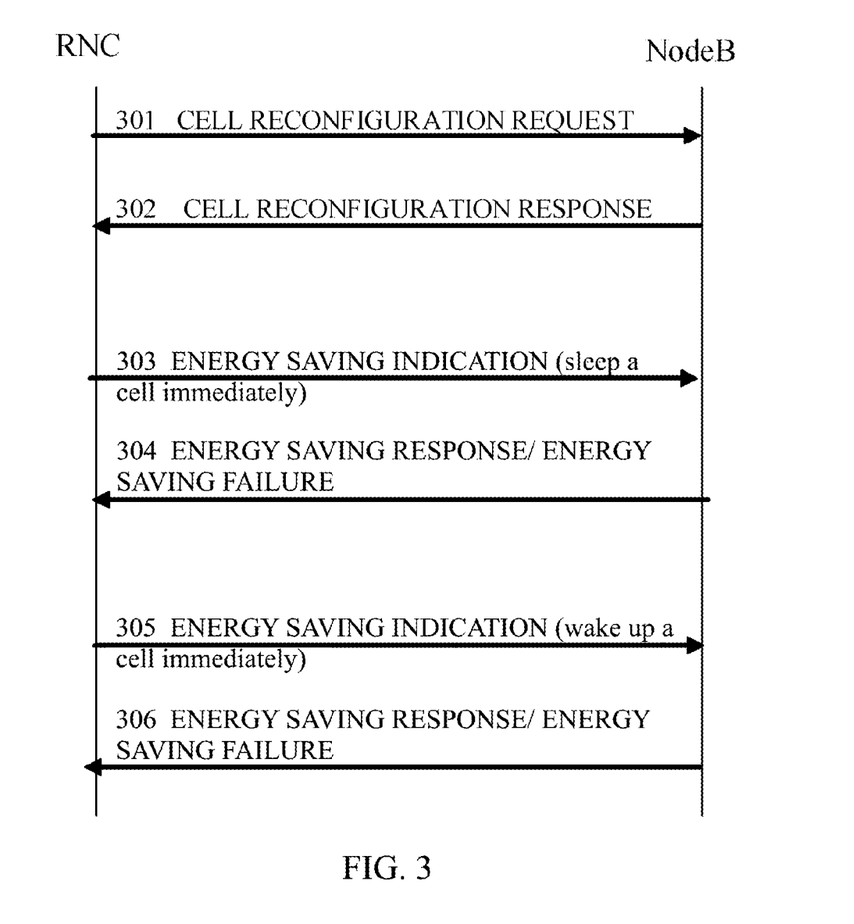
FIG. 3 is a flow chart of example 3 of the present invention.

In this example, the RNC controls cell sleeping friendly, uses an energy savings control indication message (ENERGY SAVING INDICATION) to carry the energy saving control indication; and uses an energy savings control response message (ENERGY SAVING RESPONSE) to indicate that the process succeeds; and uses an energy saving control failure message (ENERGY SAVING FAILURE) to indicate that the process fails. As shown in FIG. 3, the following steps are comprised, wherein steps 301~304 are the process of sleeping a cell, and steps 305~306 are the process of waking up a cell.

Step 301, the RNC determines whether it is required to initiate an energy saving control indication, a determination method based on time periods etc. may be used to determine whether a cell is required to sleep or wake up; and when the RNC determines the condition of sleeping the cell is meet, the RNC makes the NodeB gradually reduce the pilot channel power of carriers by a CELL RECONFIGURATION REQUEST;

Step 302, after receiving the CELL RECONFIGURATION REQUEST, the NodeB gradually reduces the pilot channel power of carriers, and if the process succeeds, the NodeB returns a CELL RECONFIGURATION RESPONSE; if the process fails, the NodeB returns a CELL RECONFIGURATION FAILURE;

Users under this cell will be switched into other cells according to the exiting switching policy due to gradually weakening of the pilot signal, and users just accessing this cell will be rejected.

In steps 301~302, reducing pilot channel power by cell reconfiguration may be accomplished by a plurality of cells configuration processes to gradually reduce pilot power, thereby insuring that calls of users are not dropped;

Step 303, after the pilot power of the cell is reduced to a certain value, the RNC sends an indication of sleeping a cell immediately by an ENERGY SAVING INDICATION message to instruct the NodeB to sleep the cell immediately;

Step 304, after receiving, the NodeB sleeps the cell immediately, and if the process succeeds, the NodeB returns an ENERGY SAVINGS RESPONSE; and if the process fails, returns an ENERGY SAVING FAILURE;

Step 305, the RNC determines whether it is required to initiate an energy saving control indication (a determination method based on time periods etc. may be used to determine whether a cell is required to sleep or wake up), and when the RNC determines that the condition of waking up the cell is meet, the RNC sends an indication of sleeping a cell immediately by an ENERGY SAVING INDICATION message to instruct the NodeB to wake up the cell immediately;

Step 306, after receiving the ENERGY SAVING INDICATION message, the NodeB wakes up the cell immediately, if the process succeeds, the NodeB returns an ENERGY SAVINGS RESPONSE; and if the process fails, returns an ENERGY SAVINGS FAILURE.

EXAMPLE 4

Figure 4:
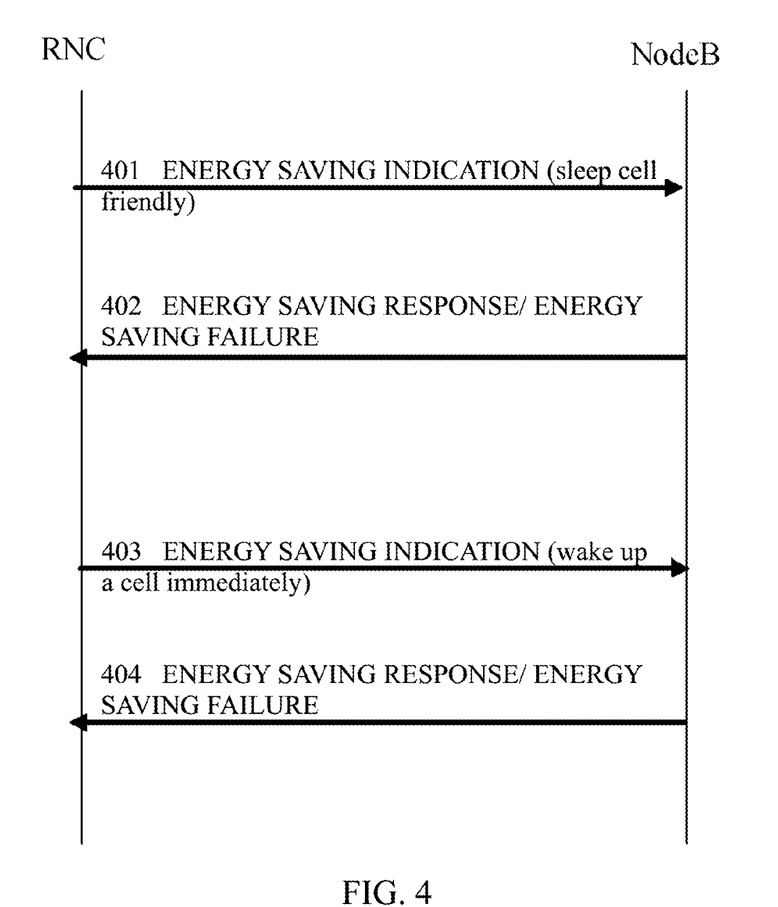
FIG. 4 is a flow chart of example 4 of the present invention.

In this example, the NodeB controls cell sleeping friendly, uses an energy saving control indication message (ENERGY SAVING INDICATION) to carry the energy saving control indication; and uses an energy savings control response message (ENERGY SAVING RESPONSE) to indicate that the process succeeds; and uses an energy saving control failure message (ENERGY SAVINGS FAILURE) to indicate that the process fails. As shown in FIG. 4, the following steps are comprised, wherein steps 401~402 are the process of sleeping a cell, and steps 403~404 are the process of waking up a cell.

Step 401, the RNC determines whether it is required to initiate an energy saving control indication, a determination method based on time periods etc. may be used to determine whether a cell is required to sleep or wake up; and after the RNC determines that the condition of sleeping the cell is meet, the RNC sends an indication of sleeping a cell friendly by an ENERGY SAVING INDICATION message to instruct the NodeB to sleep a cell friendly;

Step 402, after receiving the ENERGY SAVING INDICATION message, the NodeB gradually reduces the pilot channel power of carriers automatically. When the pilot channel power of carries is reduced to a certain value, the NodeB sleeps the cell; and if the process succeeds, the NodeB returns an ENERGY SAVING RESPONSE; and if the process fails, the NodeB returns an ENERGY SAVING FAILURE;

Step 403, the RNC determines whether it is required to initiate an energy saving control indication (a determination method based on time periods etc. may be used to determine whether a cell is required to sleep or wake up); and when the RNC determines that the condition of waking up the cell is meet, the RNC sends an indication of waking up a cell immediately by an ENERGY SAVING INDICATION message to instruct the NodeB to wake up the cell immediately;

Step 404, after the NodeB receives, the NodeB wakes up the cell immediately, and if the process succeeds, the NodeB returns an ENERGY SAVING RESPONSE; if the process fails, the NodeB returns an ENERGY SAVING FAILURE.

Although the present invention is described in conjunction with the particular examples, it is understood for the people having ordinary skill in the art that many modifications and variations may be made without deviating from the spirit and scope of the invention, which all are covered by the scope of the present invention and the scope of the claims appended.

Industrial Applicability

The present invention provides a method for implementing energy saving control at a NodeB to achieve the aim of energy savings and environmental protection at the NodeB through instructing by the RNC the NodeB to operate energy saving control. The present invention can achieve the effect of energy saving and environmental protection at the base station without changing hardwares, and the process of entering into the energy saving state is rapid, and ensures that calls of users will not be dropped during the process of entering into the energy saving state.

What is claimed is:

1. A method for implementing energy saving control at a NodeB, comprising:

when a Radio Network Controller (RNC) determines a cell of a NodeB is required to sleep, the RNC sending an indication of sleeping the cell to the NodeB, and the NodeB sleeping said cell to enter into an energy saving state; and when the RNC determines the cell of the NodeB is required to wake up, the RNC sending an indication of waking up a cell to the NodeB, and the NodeB waking up said cell to exit the energy saving state wherein the step of said RNC sending an indication of sleeping the cell to the NodeB, and the NodeB sleeping the cell comprises:

the RNC sending an energy saving control indication to the NodeB to instruct the NodeB to sleep the cell friendly;

the NodeB switching users in the cell required to sleep into other cells; and the NodeB sleeping said cell;

wherein the step of said RNC sending an indication of waking up the cell to the NodeB, and the NodeB waking up said cell comprises:

the RNC sending an energy saving control indication to the NodeB to instruct the NodeB to wake up the cell immediately; and the NodeB recovering a working state value of pilot channel power of a carrier of the cell;

wherein a cell reconfiguration request message is used to carry said energy saving control indication;

a cell reconfiguration response message is used to indicate that energy saving control process is successful; and a cell reconfiguration failure message is used to indicate that energy saving control process is failed, wherein the cell reconfiguration failure message carries a failure cause indicating that energy saving control fails;

or, an energy saving control indication message is used to carry said energy saving control indication;

an energy saving control response message is used to indicate that energy saving control process is successful; and an energy saving control failure message is used to indicate that energy saving control process is failed.

2. The method as claimed in claim 1, wherein the step of said RNC sending an indication of sleeping the cell to the NodeB, and the NodeB sleeping said cell comprises:

the RNC making users in the cell of the NodeB required to sleep be switched into other cells;

the RNC sending an energy saving control indication to the NodeB to instruct the NodeB to sleep the cell immediately; and the NodeB sleeping the cell.

3. The method as claimed in claim 2, wherein the RNC makes the users in the cell of the NodeB required to sleep into other cells by controlling the NodeB to gradually reduce pilot channel power of the carrier of the cell required to sleep.

4. The method as claimed in claim 1, wherein the NodeB switches users in the cell required to sleep into other cells by gradually reducing pilot channel power of the carrier of the cell required to sleep.

5. A system for implementing energy saving control at a NodeB, including a Radio Network Controller (RNC) and a NodeB; wherein when a cell of the NodeB is required to sleep, the RNC is configured for sending an indication of sleeping a cell to the NodeB, and when the cell of the NodeB is required to wake up, the RNC is configured for sending an indication of waking up the cell to the NodeB; and the NodeB is configured for sleeping or waking up said cell according to the indication of the RNC;

wherein said RNC is configured to send an energy saving control indication to the NodeB to instruct the NodeB to sleep the cell friendly, and the NodeB is also configured to switch users in the cell required to sleep into other cells and the NodeB sleeping said cell;

wherein said RNC is configured to send the indication of waking up the cell to the NodeB by sending an energy saving control indication to the nodeB to instruct the NodeB to wake up the cell immediately;

wherein the NodeB is configured to recover a working state value of pilot channel power of a carrier of the cell;

wherein a cell reconfiguration request message is used to carry said energy saving control indication;

wherein a cell reconfiguration response message is used to indicate that energy saving control process is successful; and a cell reconfiguration failure message is used to indicate that energy saving control process is failed, wherein the cell reconfiguration failure message carries a failure cause indicating that energy saving control fails;

or, an energy saving control indication message is used to carry said energy saving control indication;

an energy saving control response message is used to indicate that energy saving control process is successful; and an energy saving control failure message is used to indicate that energy saving control process is failed.

6. The system as claimed in claim 5, wherein said RNC is also configured for making users in the cell of the NodeB required to sleep be switched into other cells, and then sending an energy saving control indication to the NodeB to instruct the NodeB to sleep the cell immediately.

* * * * *